Aug. 21, 1934.         V. E. CARBONARA         1,970,544
                           ALTIMETER
                       Filed May 13, 1933         3 Sheets-Sheet 1

INVENTOR.
VICTOR E. CARBONARA.
BY
Stephen Cerstvik.
ATTORNEY

Aug. 21, 1934.   V. E. CARBONARA   1,970,544
ALTIMETER
Filed May 13, 1933   3 Sheets-Sheet 2

INVENTOR.
VICTOR E. CARBONARA.
BY *Stephen Ceristvik*
ATTORNEY

Aug. 21, 1934.  V. E. CARBONARA  1,970,544
ALTIMETER
Filed May 13, 1933  3 Sheets-Sheet 3

INVENTOR.
VICTOR E. CARBONARA.
BY
Stephen Cerstvik
ATTORNEY

Patented Aug. 21, 1934

1,970,544

UNITED STATES PATENT OFFICE 1,970,544

ALTIMETER

Victor E. Carbonara, Rockville Center, N. Y., assignor to Bendix Aviation Corporation, South Bend, Ind., a corporation of Delaware Application May 13, 1933, Serial No. 670,974

16 Claims. (Cl. 73—4)

The present invention relates to indicating instruments such, for example, as sensitive altimeters and constitutes a continuation in part of the invention disclosed in co-pending application Serial No. 641,446 filed November 5, 1932.

As pointed out in the above-mentioned co-pending application, in indicating instruments of certain types, such as altimeters, it is desirable that they be capable of adjustment under one condition for a second and predetermined condition and that they indicate when said predetermined condition occurs or is reached, and also indicate the predetermined condition for which the instrument is adjusted.

In altimeters, for example, and particularly in sensitive altimeters embodying a plurality of scales and cooperating pointers for indicating altitude in hundreds and thousands of feet, this adjusting feature may be embodied therein in such a manner that the altimeter may be preset at one airport having one pressure-level altitude with respect to sea-level for a pressure-level altitude of another airport to and at which it is desired to fly and land, so that when the aircraft on which the altimeter is carried lands at the second airport the altimeter will indicate zero altitude, thereby providing a pilot with correct indications of the altitude of his craft with respect to the ground at the airport at which he is going to land. Simultaneously operable with this adjusting mechanism may be embodied a reference means separate from the pointer scales for indicating, as a positive quantity and in numbers, the barometric pressure at the airport to which the pilot is going to fly and for which the altimeter has been adjusted.

In the above-mentioned co-pending application the predetermined condition for which the altimeter is set is indicated in terms of altitude in feet so that when the aircraft lands at the airport whose altitude is that indicated on the reference indicating means, the pointers will read zero and will give a true indication of the height of the aircraft with respect to the ground at that particular airport. Since, however, the radio reports broadcast from airports to aircraft in flight designate the pressure-level altitudes of said airports in terms of barometric pressure rather than an altitude in feet because of day to day changes in the barometric pressure, it is desirable to indicate the preset condition of the altimeter in such terms rather than in terms of altitude in feet.

In view of the fact, however, that the altimeter scale or scales are calibrated in feet and the reference indicating means are calibrated in inches of mercury, the increments of changes in the indication of the two occur in a varying ratio and for this reason novel means are provided, in accordance with the present invention, for taking care of this varying ratio so that when the altimeter is adjusted for a predetermined barometric pressure which is indicated on the reference means in inches of mercury, the pointers will be adjusted in the proper ratio with respect to their scales in feet and, hence, will indicate zero when the barometric pressure occurs or is reached for which the altimeter has been set.

Although the invention finds its maximum utility when applied to altimeters, and more particularly to sensitive altimeters having a pluraltiy of pointers and scales, it is to be expressly understood that it may be readily and advantageously embodied in other types of instruments such, for example, as aneroid thermometers, barometers, pressure gauges, flowmeters, stress indicators, hygrostats, barographs, and in fact in any other type of indicating instrument which is adapted to indicate changes in conditions and in which there is a varying ratio between the increments of the indicating scale and the increments of the reference indicating means.

Accordingly, one of the objects of the invention is to provide in an indicating instrument embodying means whereby it may be set for a predetermined condition and to indicate such condition upon its being reached, and means to indicate, in different quantities, the predetermined condition at the time that the instrument is set and until a new setting is made, novel means for compensating for a varying ratio in the increments of changes of the two indicating means due to the fact that said two indicating means are calibrated to produce indications in different units or quantities.

Another object is to provide a novel instrument of the class described which is relatively simple in construction yet extremely sensitive, of high efficiency and perfect operation, and embodying relatively few parts whereby the instrument may be manufactured economically on a production basis.

The above and other objects and advantages of the invention will appear more fully hereinafter from a consideration of the detailed description which follows when taken together with the accompanying drawings, wherein one embodiment of the invention is illustrated. It is to be expressly understood, however, that the drawings are for the purpose of illustration and description only and are not designed as a definition of the limits of the inventon, reference being had for this purpose to the appended claims.

In the drawings, wherein like reference characters refer to like parts throughout the several views.

Referring to the drawings, the instrument embodying the present invention is shown in the form of an altimeter having an evacuated pressure-sensitive element which is adapted to expand and contract upon variations of pressure due to changes in altitude, and amplification mechanism for amplifying the relatively small movements of the pressure sensitive element into readily discernible movements of a plurality of pointers over cooperating scales to indicate the altitude in feet or meters or in terms of any other linear function, the pointers being geared together in such a manner that one moves only a fraction of a revolution for one complete revolution of the other, the latter indicating the altitude in hundreds of feet and the former in thousands of feet or in units having the same or different linear ratios.

Figure 2:
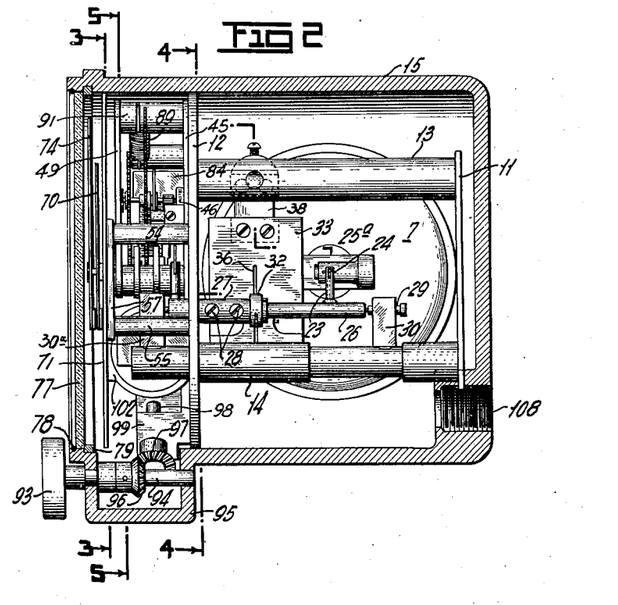
Fig. 2 is a longitudinal sectional view of the instrument casing showing the functional relationship of the various elements of the device shown in Fig. 1.
Figure 3:
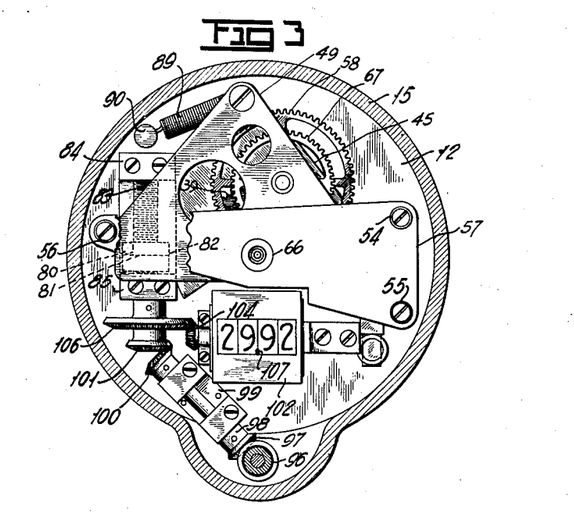
Fig. 3 is a cross-sectional view taken on line 3—3 of Fig. 2.
Figure 4:
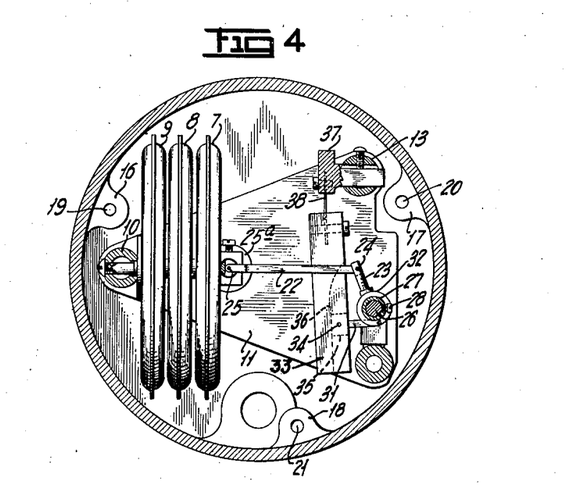
Fig. 4 is another cross-sectional view taken on the line 4—4 of Fig. 2.

In the form shown, the pressure sensitive element comprises one or more aneroid capsules such, for example, as 7, 8 and 9 carried by a supporting member in the form of a transversely extending rod 10 secured to a triangularly-shaped plate 11, the latter being secured to and spaced from a cooperating supporting plate 12 (Fig. 2) by means of other transversely extending rods 13 and 14 so that said plates 11 and 12, together with the rods 10, 13 and 14, form a unitary supporting structure for the entire mechanism of the altimeter whereby it may be readily inserted into or withdrawn from a suitable cup-shaped casing 15 and secured within the latter by means of suitable bosses 16, 17 and 18 (Fig. 4) secured to or formed integral with the interior of the casing 15, and by means of screws (not shown) which are adapted to pass through the plate 12 and engage the bosses 16, 17 and 18 in threaded openings 19, 20 and 21, respectively. Means are provided for employing and amplifying the movements of the aneroid capsules upon actuation thereof due to changes in atmospheric pressure, to produce indications which, as stated hereinbefore, may be in terms of altitude in feet or meters or in any other linear quantity. In the form shown, said means comprise a pair of links 22 and 23 pivotally connected together at 24, the link 22 being in turn pivotally and adjustably connected at 25 to a bracket 25a carried by the aneroid capsule 7, and the link 23 being rigidly fastened to a rock-shaft 26 adjustably secured within a sleeve 27 by means of two set screws 28 (Fig. 2). The rock-shaft 26 is journaled at one end by means of an adjustable pivot 29 carried by a supporting block 30 secured to the spacing rod 14, while the other end is journaled in a similar block 30a also secured to the spacing rod 14, said rock-shaft 26 and sleeve 27 extending through the plate 12. The sleeve 27, and hence the rock-shaft 26, is pivotally connected to a link 31 by means of a collar 32 carried by and movable with the sleeve 27, and the link 31 is in turn pivotally connected to a counterweight 33 by means of a pin 34 which extends transversely through the counterweight and through an enlarged portion 35 of the link 31 which fits into a slot 36 provided in the counterweight 33 substantially at the center and longitudinally thereof. The counterweight 33 is resiliently supported from a block 37 by means of a leaf spring 38, the block 37 being adjustably mounted on the spacing rod 13. The purpose of the counterweight 33 and its connection to the rock-shaft 26 by means of the link 31 and sleeve 27 is to provide a complete balance of the elastic system in order to prevent movement thereof due to vibration, acceleration forces, etc. In other words, the rock-shaft 26 is actuated only by the expansion and contraction of the aneroid capsules 7, 8 and 9 and not by any undesirable and/or extraneous forces.

Figure 1:
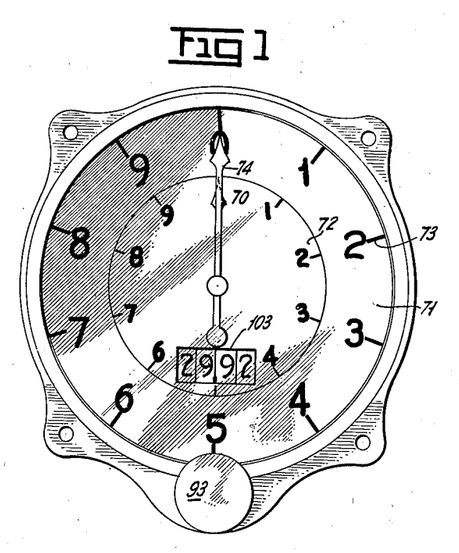
Fig. 1 is a front view of one form of instrument embodying the present invention.

The sleeve 27 is pivotally secured to the center of a gear sector 39 by means of a pair of links 40 and 41 (Fig. 5) said sector being arranged to mesh with a pinion 42 carried by a counter-shaft 43 journaled at one end in a bushing 44 carried by an angularly adjustable plate 45 (Fig. 6) by means of a jewel bearing 46, and at its other end in a similar bushing 47 of a jewel bearing 48, said bushing 47 being carried by a similar angularly adjustable plate 49. The gear sector 39 is provided with a counterweight 50 and is secured to a stub shaft 51 journaled in a bushing 52 within the plate 12 by means of a jewel bearing 53. Parallel to the plate 12 and spaced therefrom by means of spacing rods 54, 55 and 56 is a dial plate 57, said dial plate thereby providing a fixed support for the pointer mechanism and other members which will be described hereinafter. Secured to the shaft 43 is a relatively large gear 58 which meshes with a relatively small pinion 59 carried by a counter-shaft 60 journaled by means of jewel bearings provided in bushings 61 and 62, respectively; said bushings being mounted in a pair of supporting plates 63 and 64, respectively, which are secured to a spacing rod 65, the latter also serving to hold the angularly adjustable plates 45 and 49 together in spaced relation. The angularly adjustable plates 45 and 49 thus constitute a unitary rotatable member which is journaled on bushings 52 and 66, the bushing 66 being carried by the dial plate 57, so that said plates 45 and 49 may be moved angularly as a unit on said bushings for a purpose which will appear more fully hereinafter. On the shaft 43 is mounted another relatively large gear 67 which meshes with a pinion 68 carried by a hollow shaft 69 journaled in and extending through the bushing 66, said hollow shaft 69 constituting a pointer shaft on which is carried a small pointer 70 which traverses a dial 71 secured to the plate 57 and upon which is engraved or etched a scale 72 (Fig. 1) marked in thousands of feet, for example. Concentric with the scale 72 is another scale 73 which is graduated in hundreds of feet and has cooperating therewith a large pointer 74, the latter being carried on the shaft 60 which extends through the hollow shaft 69 and is operated by the pinion 59. The ratio of movement of the large pointer 74 to the small pointer 70 is, in the present instance, ten to one by virtue of the ratio between the gear 58 and pinion 59 and the gear 67 and pinion 68, so that the large pointer makes a complete revolution while the small pointer makes only one-tenth of a revolution, this ratio being in accordance with the scales 73 and 72, respectively.

In order to take up back-lash, a hair spring 75 is provided which has its inner end secured to the shaft 43 and its outer end secured to a post 76 carried by the angularly adjustable plate 45.

A cover glass 77 (Fig. 2) of some suitable transparent material which may be other than glass is secured to the open end of the cup-shaped instrument casing 15 in any suitable manner as by means of a split clamping ring 78 and a collar 79 pressed into the periphery of the open end of the casing 15, so that the pointers 70 and 74 may be viewed therethrough in their cooperation with the scales 72 and 73.

Figure 6:
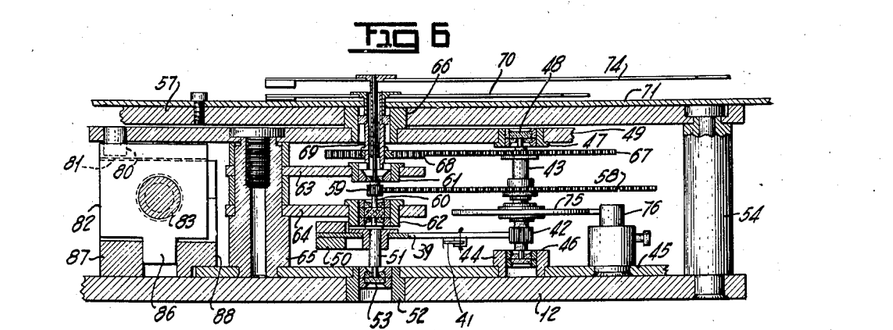
Fig. 6 is an enlarged detailed sectional view taken on line 6—6 of Fig. 5, of the adjusting mechanism embodying the novel means for compensating for the varying ratio of the increments of change between the pointers and the reference indicating means.

It will be apparent from the foregoing that as aneroid capsules 7, 8 and 9 are actuated by changes in barometric pressure, the rockshaft 26 is actuated through the links 22 and 23 to cause movement of the gear sector 39 through the links 40 and 41, thereby operating the pointers 70 and 74 in the proper ratio through the gear trains 39—42, 58—59 and 67—68. It will also be apparent that pointers 70 and 74 will indicate the altitude with respect to barometric pressure or sea-level and not the true altitude with respect to ground; i. e., the pointers would indicate zero only when the instrument is at sea-level under normal conditions and, therefore, it is desirable that the instrument be capable of adjustment to indicate zero when the instrument is on the ground regardless of the altitude of the ground with respect to sea-level. It is further desirable that the instrument be capable of being set under one condition for a second condition and to indicate when the second condition occurs or is reached. To this end novel means are provided for making such adjustment and, in the form shown, comprise actuating means for causing relative movement between the pointers and their respective scales in their proper ratio so that the pointers will indicate zero when the instrument reaches the altitude and barometric pressure for which it was set. In the present instance, said actuating means are constituted by the same gear train as is employed for actuating the pointers by the operation of the rock-shaft 26 upon expansion and contraction of the pressure sensitive element, and include means for producing a planetary action within said gear train, for which purpose the plates 45 and 49, in which the shaft 43 is journaled, are made angularly adjustable about the common axis of the pointers, namely, about the axis of shaft 60 and hollow shaft 69, said axis being a line extending through the centers of the bushings 52 and 66 (Fig. 6).

Means are, therefore, provided for causing angular movement of the plates 45 and 49 about their bushings 52 and 66, respectively, said means comprising a pin 80 secured to and projecting from the inner side of plate 49 and into a cut-away portion 81 of an internally threaded block or nut 82 through which extends a threaded shaft 83 journaled in a pair of blocks 84 and 85 (Fig. 5) carried by the plate 12, said block or nut 82 being adapted for longitudinal movement along the threaded shaft 83 upon rotation of the latter. Rotation of the block or nut 82 is prevented by means of a projection 86 provided on said block and extending between a pair of guides 87 and 88 carried by the plate 12. Since the block or nut 82 cannot rotate and is in threaded engagement with the threaded shaft 83, the rotation of the latter will impart longitudinal movement to the nut 82 along the guides 87 and 88, thereby imparting movement to the pin 80 with which the block or nut is in engagement and thus causing angular movement of the plates 45 and 49 while the pin 80 slides along the cut-away portion 81 of said block or nut 82. In order to provide a return movement of the angular plates 45 and 49 when the nut or block 82 moves longitudinally downward, as viewed in Fig. 5, and hence to maintain engagement of the block with pin 80, there is provided a tension spring 89 which has one end thereof secured to a fixed post 90 and the other end to a spacing rod 91 which holds said plates 45 and 49 in spaced relation together with the rod 65 and another rod 92.

The threaded shaft 83 is adapted to be actuated from the front of the instrument by means of a knob 93 secured to a shaft 94 journaled in an auxiliary compartment 95 formed with the main casing 15. On the shaft 94 is provided a bevel pinion 96 which meshes with and drives a bevel gear 97 carried by a shaft 98 which is journaled in the bracket 99 carried by the plate 12. On the other end of the shaft 98 there is another bevel pinion 100 which meshes with and drives a bevel gear 101 carried by the threaded shaft 83 which projects through the block 85, thereby rotating said threaded shaft 83 and thus causing longitudinal movement of the block or nut 82 along said threaded shaft to actuate the plates 45 and 49 by means of the pin 80.

By virtue of the sliding engagement between the pin 80 and the nut 82 there are produced unequal angular increments of movement of the pin along an arc the center of which is at the axis of rotation of the plates 45 and 49 while the block moves in equal linear increments along a tangent to the arc. The reason for obtaining the unequal angular increments of movement of the plates 45 and 49 for equal linear increments of the nut 82 is for the reason that for equal angular increments of changes in barometric pressure the corresponding increments in feet of altitude are unequal and, as will appear more fully hereinafter, the reference indicating means for indicating the setting of the instrument are calibrated in terms of barometric pressure in inches of mercury whereas the scales which coperate with the pointers are calibrated in feet of altitude.

It will be apparent from the foregoing that upon rotation of the threaded shaft 83 by means of the knob 93 through the bevel gears 96, 97, 100 and 101, the nut 82 will be caused to move longitudinally of the threaded shaft 83 thus causing angular movement of the pin 80 and hence the plates 45 and 49, the latter carrying along therewith the shaft 43 which is journaled in said plates 45 and 49. Therefore, as the shaft 43 revolves about the center of the bushings 52 and 66 as an axis, the pinion 42 will be driven by the gear sector 39 since the latter is relatively stationary, and rotation of the pinion 42 thereby drives the pointers 74 and 70 through the gear trains 58—59 and 67—68, respectively, in the same ratio as when said pointers are actuated through the same gear train by the gear sector 39 and pinion 42. It will also be apparent that the pointers may be operated by the pressure-responsive element while and during the time that a setting is being made, by virtue of the fact that the rotation of the pinion 42 may be a resultant rotation produced by angularly moving the shaft 43 and that produced by the gear sector 39 driving the pinion 42 due to the operation of the gear sector by the pressure-sensitive element. Hence the setting may be made while the instrument is indicating. Relative movement may be caused between the pointers and their respective scales to any degree which may be desired by manipulating the knob 93 so that said pointers will produce a desired indication on the scales, as, for example, a zero reading when the desired condition or pressure level altitude for which the instrument is set has occurred or has been reached.

It is also desirable that the condition for which the instrument is to be set may be indicated at the time the setting is being made and at such indication remain unchanged so that it may be employed as a reference point. In accordance with the present invention, however, it is desirable that the preset condition be indicated in terms of barometric pressure in inches of mercury while the pointers are preset with respect to their scales in feet in an amount corresponding to the altitude in feet for the particular barometric pressure indicated by the reference indicating means. In other words if it is desired to set the pointers so that they will indicate zero altitude when a certain barometric pressure is reached, it is essential that such barometric pressure be indicated at the time the setting is made and in inches of mercury and in whole digits, preferably to within hundredths of an inch of mercury. To this end means are provided whereby the indication of the desired condition, for example, the barometric pressure for which the instrument is set is produced simultaneously with the actuation of the threaded shaft 83. In the form shown, said means comprise a counter 102 carried by the fixed plate 12 and arranged so that the number carrying dials thereof are visible through an opening 103 (Fig. 1) provided in the dial 71 at any convenient point as, for example, at the lower portion of the scale 72.

Figure 5:
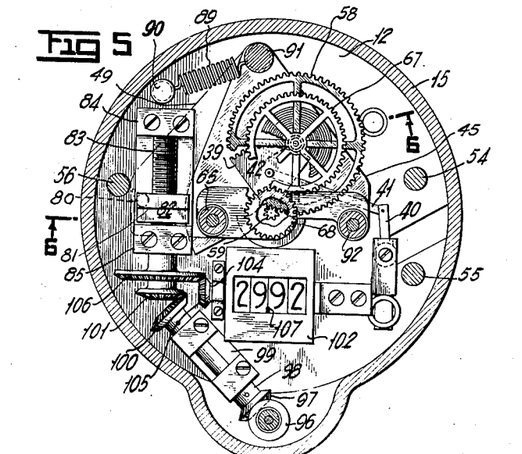
Fig. 5 is still another cross-sectional view taken on the line 5—5 of Fig. 2.

The number carrying dials of the counter, which for the purpose of the present invention are marked in inches of mercury, are actuated simultaneously with the setting of the pointers by means of the knob 93 through a shaft 104 on which is carried a bevel pinion 105, the latter meshing with a bevel gear 106 mounted on and rotatable with the threaded shaft 83. An index 107 is provided for dividing the four digits of the number carrying dials of the counter 102 into two decimal places thereby giving an indication of barometric pressure to within hundredths of an inch, said index member 107 will be carried by the front plate of the counter as shown in Fig. 5 or if desired may be made as a projection forming part of the dial 71 and extending into the opening 103 thereof.

It will be apparent from the foregoing that when the knob 93 is operated to adjust the instrument for a desired condition, in the present instance barometric pressure, relative movement is caused between the pointers and their respective dials through their respective gear trains by the actuation of the threaded shaft 83 and the nut 82 and simultaneously with the movement of the pointers the shaft 104 is also actuated thereby rotating the number carrying dials of the counter to indicate the condition for which the instrument has been set, said indication being in whole digits and in inches and hundredths of an inch of mercury. Thereafter, the pointers are operated independently of the counter through their respective gear trains by means of the rock-shaft 26 to produce the required indication on the scales 72 and 73 when the barometric pressure occurs or has been reached for which the instrument has been set and which barometric pressure is indicated on the counter.

Assuming, for example, that the instrument is at sea level under normal barometric pressure, at which time the pointers 70 and 74 indicate zero on their respective scales 72 and 73, and the number of carrying dials of the counter indicate said normal barometric pressure. If the pilot of a craft on which the instrument is mounted now desires to fly to a landing field which has a pressure level altitude different from that at which he is initially, he rotates the knob 93 until the barometric pressure prevalent at the other field, as announced by radio reports, is indicated on the counter, at which time relative movement is also caused between the pointers 70 and 74 and their respective dials in increments of feet corresponding to the increments of barometric pressure so that they no longer indicate zero on their scales but have been moved counter-clockwise from the zero mark by an amount on their scales which is necessary for the pointers to traverse for a change of altitude corresponding to the change in barometric pressure. The relative position of the pointers with respect to their scales is now such that they are to the left of the zero on the scales by an amount in feet corresponding to the amount of change in barometric pressure in inches of mercury but will indicate zero when the pilot reaches the field for which he is flying and for which the instrument has been adjusted. The setting of the counter, however, remains unchanged during the indication action of the pointers and until the instrument is again adjusted by means of the knob 93.

In order to place the interior of the instrument casing 15 in communication with the true static pressure of the atmosphere, the casing is provided with a threaded opening 108 (Fig. 2) to which may be connected a pipe leading to the static head of a pitot tube (not shown) secured to a wing of the craft.

There is thus provided a novel indicating instrument which may be set under one condition for a second condition so that it will indicate when the second condition occurs or is reached, and which also indicates, on a reference indicator separate from the scale and calibrated in different units from the latter, the condition for which it has been set independently of the indicating action of the instrument, and capable of being set while the instrument is indicating. As pointed out hereinbefore the invention is particularly suitable for use in a sensitive altimeter whereby a pilot can set his instrument at a flying field having one barometric pressure, so that it will indicate zero altitude when he reaches a second flying field whose barometric pressure is different from that of the first flying field, and which barometric pressure can be set into the instrument as a positive indication in whole digits in terms of inches and hundredths of an inch of mercury.

Although only one embodiment of the invention has been illustrated and described, other changes and modifications which will now appear to those skilled in the art may be made without departing from the scope of the invention. It is also obvious that the counter 102 and the pointer scales 72 and 73 may be calibrated in other units in the event that the invention is applied to an instrument other than an altimeter and in which the units of the pointer scales differ from the units of the counter. Reference is, therefore, to be had to the appended claims for a definition of the limits of the invention.

What is claimed is:

1. In an indicating instrument, pointer means, scale means cooperating with said pointer means, means for causing relative movement between the scale and pointer means to set the instrument for a predetermined condition or quantity so that it will give a desired reading when said predetermined condition occurs or the predetermined quantity is reached, reference means simultaneously operable with said setting means for indicating the preset condition or quantity separately from the scale and pointer means and calibrated in units different from the units of the scale means, said units having a varying ratio in increments of change to the increments of change in the units of the scale means, and means included in said setting means for producing increments of change in the reference indicating means and increments of change in the indication of the pointer means on the scale means such that the latter indication corresponds to the reference indication in the respective units but the increments of change of the two indications are unequal while the relation of said indications is always maintained.

2. In an indicating instrument, a pointer, a scale cooperating with said pointer, means for causing relative movement between the scale and pointer to set the instrument for a predetermined condition or quantity so that it will give a desired reading when said predetermined condition occurs or the predetermined quantity is reached, reference means simultaneously operable with said setting means for indicating the preset condition or quantity separately from the scale and calibrated in units different from the units of the scale, said units having a varying ratio in increments of change to the increments of change in the units of the scale, and means included in said setting means for producing increments of change in the reference indicating means and increments of change in the indication of the pointer on the scale such that the latter indication corresponds to the reference indication in the respective units but the increments of change of the two indications are unequal while the relation of said indications is always maintained.

3. In an indicating instrument, pointer means, scale means cooperating with said pointer means, means for causing relative movement between the scale and pointer means to set the instrument for a predetermined condition or quantity so that it will give a desired reading when said predetermined condition occurs or the predetermined quantity is reached, reference means simultaneously operable with said setting means for indicating the preset condition or quantity separately from the scale and pointer means and calibrated in units different from the units of the scale means, said units having a varying ratio in increments of change to the increments of change in the units of the scale means, and means included in said setting means for producing increments of change in the reference indicating means and increments of change in the indication of the pointer means on the scale means such that the latter indication corresponds to the reference indication in the respective units but the increments of change of the two indications are unequal while the relation of said indications is always maintained, said last-mentioned means comprising a rotatable threaded shaft, an internally threaded member engaging said shaft and longitudinally movable therealong upon rotation of the shaft, and a pin slidably engaging said internally threaded member and angularly movable in unequal increments for equal increments of longitudinal movement of the threaded member.

4. In an indicating instrument, a pointer, a scale cooperating with said pointer, means for causing relative movement between the scale and pointer to set the instrument for a predetermined condition or quantity so that it will give a desired reading when said predetermined condition occurs or the predetermined quantity is reached, reference means simultaneously operable with said setting means for indicating the preset condition or quantity separately from the scale and calibrated in units different from the units of the scale, said units having a varying ratio in increments of change to the increments of change in the units of the scale, and means included in said setting means for producing increments of change in the reference indicating means and increments of change in the indication of the pointer on the scale such that the latter indication corresponds to the reference indication in the respective units but the increments of change of the two indications are unequal while the relation of said indications is always maintained, said last-mentioned means comprising a rotatable threaded shaft, an internally threaded member engaging said shaft and longitudinally movable therealong upon rotation of the shaft, and a pin slidably engaging said internally threaded member and angularly movable in unequal increments for equal increments of longitudinal movement of the threaded member.

5. In an altimeter, a pressure-responsive device, pointer means operated by said device, scale means cooperating with said pointer means and calibrated to indicate altitude in linear units, means for causing relative movement between the scale and pointer means to set the altimeter for a predetermined barometric pressure so that it will give a desired reading of altitude when said predetermined barometric pressure occurs or is reached, reference means simultaneously operable with said setting means for indicating the preset barometric pressure and calibrated in linear units of mercury, said units having a varying ratio in increments of change to the increments of change in the units of the scale means, and means included in said setting means for producing increments of change in the reference indicating means and increments of change in the indication of the pointer means on the scale means such that the latter indication in units of altitude corresponds to the reference indication in units of mercury but the increments of change of the two indications are unequal while the relation of said indications is always maintained.

6. In an altimeter, a barometric pressure responsive device, a pointer operated by said device, a scale cooperating with said pointer and calibrated to indicate altitude in linear units, means for causing relative movement between the scale and pointer to set the altimeter for a predetermined barometric pressure so that it will give a desired reading of altitude when said predetermined barometric pressure occurs or is reached, reference means simultaneously operable with said setting means for indicating the preset barometric pressure and calibrated in linear units of mercury, said units having a varying ratio in increments of change to the increments of change in the units of the scale, and means included in said setting means for producing increments of change in the reference indicating means and increments of change in the indication of the pointer on the scale such that the latter indication corresponds to the reference indication in the respective units but the increments of change of the two indications are unequal while the relation of said indications is always maintained.

7. In an altimeter, a pressure-responsive device, a plurality of pointers operated by said device in different degrees, a plurality of scales cooperating with said pointers and calibrated to indicate altitude in linear units, means for causing relative movement between the scales and pointers to set the altimeter for a predetermined barometric pressure so that it will give a desired reading of altitude when said predetermined barometric pressure occurs or is reached, reference means simultaneously operable with said setting means for indicating the preset barometric pressure and calibrated in linear units of mercury, said units having a varying ratio in increments of change to the increments of change in the units of the scales, and means included in said setting means for producing increments of change in the reference indicating means and increments of change in the indication of the pointers on the scales such that the latter indication in units of altitude corresponds to the reference indication in units of mercury but the increments of change of the two indications are unequal while the relation of said indications is always maintained, said last-mentioned means comprising a rotatable threaded shaft, an internally threaded member engaging said shaft and longitudinally movable therealong upon rotation of the shaft, and a pin slidably engaging said internally threaded member and angularly movable in unequal increments for equal increments of longitudinal movement of the threaded member.

8. In an altimeter, a barometric pressure-responsive device, a pointer operated by said device, a scale cooperating with said pointer and calibrated to indicate altitude in linear units, means for causing relative movement between the scale and pointer to set the altimeter for a predetermined barometric pressure so that it will give a desired reading of altitude when said predetermined barometric pressure occurs or is reached, reference means simultaneously operable with said setting means for indicating the preset barometric pressure and calibrated in linear units of mercury, said units having a varying ratio in increments of change to the increments of change in the units of the scale, and means included in said setting means for producing increments of change in the reference indicating means and increments of change in the indication of the pointer on the scale such that the latter indication corresponds to the reference indication in the respective units but the increments of change of the two indications are unequal while the relation of said indications is always maintained, said last-mentioned means comprising a rotatable threaded shaft, an internally threaded member engaging said shaft and longitudinally movable therealong upon rotation of the shaft, and a pin slidably engaging said internally threaded member and angularly movable in unequal increments for equal increments of longitudinal movement of the threaded member.

9. An indicating instrument comprising a device responsive to changes in conditions to be indicated, means supporting said device, actuator means including a member rotatably associated with said supporting means, and a shaft operated by said change responsive device and journaled in said rotatable member and being revolvable therewith about the axis of said member in addition to being rotatable on its own axis relative to said member, indicating means rotatably carried by the supporting means and operatively connected by the shaft to the change responsive device, and means to cause relative movement between said device and said rotatable member for operating the indicating means by said shaft to set the instrument for a predetermined condition, said last-named means comprising a rotatable threaded shaft, an internally threaded member engaging said shaft and longitudinally movable therealong upon rotation of the shaft, and a pin carried by the rotatable member and slidably engaging the threaded member whereby equal increments of longitudinal movement of the threaded member produce unequal increments of angular movement of the pin and rotatable member.

10. An indicating instrument comprising a device responsive to changes in conditions to be indicated, means supporting said device, actuator means including a member rotatably associated with said supporting means, and a shaft operated by said change responsive device and journaled in said rotatable member and being revolvable therewith about the axis of said member in addition to being rotatable on its own axis relative to said member, indicating means rotatably carried by the supporting means and operatively connected by the shaft to the change responsive device, means to cause relative movement between said device and said rotatable member for operating the indicating means by said shaft to set the instrument for a predetermined condition, said last-named means comprising a rotatable threaded shaft, an internally threaded member engaging said shaft and longitudinally movable therealong upon rotation of the shaft, and a pin carried by the rotatable member and slidably engaging the threaded member whereby equal increments of longitudinal movement of the threaded member produce unequal increments of angular movement of the pin and rotatable member, and reference indicating means separate from but operable with said first indicating means during setting for indicating the predetermined condition for which the instrument has been set.

11. An altimeter comprising a barometric pressure-responsive device, means supporting said device, actuator means including a member rotatably mounted on said supporting means, and a shaft operated by said pressure-responsive device and journaled in said rotatable member and being revolvable therewith about the axis of said member in addition to being rotatable on its own axis relative to said member, indicating means rotatably carried by the supporting means and operatively connected by the shaft to the pressure-responsive device, and means to cause relative movement between said pressure-responsive device and said rotatable member for operating the indicating means by said shaft to set the altimeter for a predetermined barometric pressure so that it will give a desired reading when said barometric pressure occurs or is reached, said last-named means comprising a rotatable threaded shaft, an internally threaded member engaging said shaft and longitudinally movable therealong upon rotation of the shaft, and a pin carried by the rotatable member and slidably engaging the threaded member whereby equal increments of longitudinal movement of the threaded member produce unequal increments of angular movement of the pin and rotatable member.

12. An altimeter comprising a barometric pressure-responsive device, means supporting said device, actuator means including a member rotatably mounted on said supporting means, and a shaft operated by said pressure-responsive device and journaled in said rotatable member and being revolvable therewith about the axis of said member in addition to being rotatable on its own axis relative to said member, indicating means rotatably carried by the supporting means and operatively connected by the shaft to the pressure-responsive device, means to cause relative movement between said pressure-responsive device and said rotatable member for operating the indicating means by said shaft to set the altimeter for a predetermined barometric pressure so that it will give a desired reading when said barometric pressure occurs or is reached, said last-named means comprising a rotatable threaded shaft, an internally threaded member engaging said shaft and longitudinally movable therealong upon rotation of the shaft, and a pin carried by the rotatable member and slidably engaging the threaded member whereby equal increments of longitudinal movement of the threaded member produce unequal increments of angular movement of the pin and rotatable member, and reference indicating means separate from but operable with said first indicating means during setting for indicating the predetermined barometric pressure in linear units of mercury for which the altimeter has been set.

13. In an indicating instrument having a pair of pointers, scales for the pointers, a reference indicating means, a device responsive to changes in conditions to be indicated by the pointers, gear means connecting the pointers to the device for actuating said pointers in a predetermined ratio according to their scales, the combination with said instrument of setting means to cause a simultaneous change of the indication of the pointer means and of the reference indicating means, said setting means comprising a fixed support, actuating means including means for operating said reference indicating means, a member rotatably carried by the fixed support, a rotatable threaded shaft journaled on said fixed support, and an internally threaded member engaging said threaded shaft and movable longitudinally therealong upon rotation of the shaft, a pin carried by the rotatable member and slidably engaging the internally threaded member whereby equal increments of longitudinal movement of said internally threaded member produces unequal increments of angular movement of the pin and rotatable member, a spindle journaled in said rotatable member and revolvable therewith about the axis of said member in addition to being rotatable on its own axis relative to said member and carrying a portion of said gear means which connects the pointers to the change responsive device, and a knob for operating the actuating means from the exterior of the instrument.

14. In an altimeter having a pair of pointers, scales for the pointers, a reference indicating means, a barometric pressure-responsive device responsive to changes in altitude, gear means connecting the pointers to the pressure-responsive device for actuating said pointers in a predetermined ratio according to their scales, the combination of setting means to cause a simultaneous change of the indication of the pointer means and of the reference indicating means in relatively unequal increments, said setting means comprising a fixed support, actuating means including means for operating said reference indicating means, a member rotatably carried by the fixed support, a rotatable threaded shaft journaled on said fixed support, and an internally threaded nut engaging said threaded shaft and longitudinally movable therealong upon rotation of the shaft, a pin carrier by the rotatable member and slidably engaging the threaded nut whereby equal increments of longitudinal movement of the nut produce unequal movements of the pin and rotatable member, a spindle journaled in said rotatable member and revolvable therewith about the axis of said member in addition to being rotatable on its own axis relative to said member and carrying a portion of said gear means which connect the pointers to the pressure-responsive device, and a knob for operating the actuating means from the exterior of the altimeter.

15. In an indicating instrument having a device responsive to changes in conditions to be indicated, pointer means operated by said device, scale means cooperating with said pointer mean, means for causing relative movement between the scale and pointer means to set the instrument for a predetermined condition or quantity so that it will give a desired reading when said predetermined condition occurs or the predetermined quantity is reached, a counter simultaneously operable with said setting means for indicating the preset condition or quantity in numbers separately from the scale and pointer means and in units different from the units of the scale means, said units having a varying ratio in increments of change to the increments of change in the units of the scale means, and means included in said setting means for producing increments of change in the counter indication and increments of change in the pointer and scale means indication such that the latter indication corresponds to the counter indication in the respective units but the increments of change of the two indications are unequal while the ratio of said indications is maintained.

16. In an altimeter having a barometric pressure-responsive device, pointer means operated by said device, scale means cooperating with said pointer means and calibrated in units of altitude, means for causing relative movement between the scale and pointer means to set the altimeter for a predetermined barometric pressure so that it will give a desired reading when said predetermined barometric pressure occurs or is reached, a counter simultaneously operable with said setting means for indicating the preset barometric pressure in numbers separately from the scale and pointer means and in units of mercury, said units having a varying ratio in increments of change to the increments of change in the units of the scale means, and means included in said setting means for producing increments of change in the counter indication and increments of change in the pointer and scale means indication such that the latter indication corresponds to the counter indication in the respective units but the increments of change of the two indications are unequal while the ratio of said indications is maintained.

VICTOR E. CARBONARA.

CERTIFICATE OF CORRECTION.

Patent No. 1,970,544.  August 21, 1934.

VICTOR E. CARBONARA.

It is hereby certified that error appears in the printed specification of the above numbered patent requiring correction as follows: Page 4, line 80, strike out the word "of" first occurrence; page 7, line 88, claim 14, for "carrier" read carried; and line 104, claim 15, for "mean" read means; and that the said Letters Patent should be read with these corrections therein that the same may conform to the record of the case in the Patent Office.

Signed and sealed this 5th day of February, A. D. 1935.

(Seal)

Leslie Frazer
Acting Commissioner of Patents.